Figure 3:
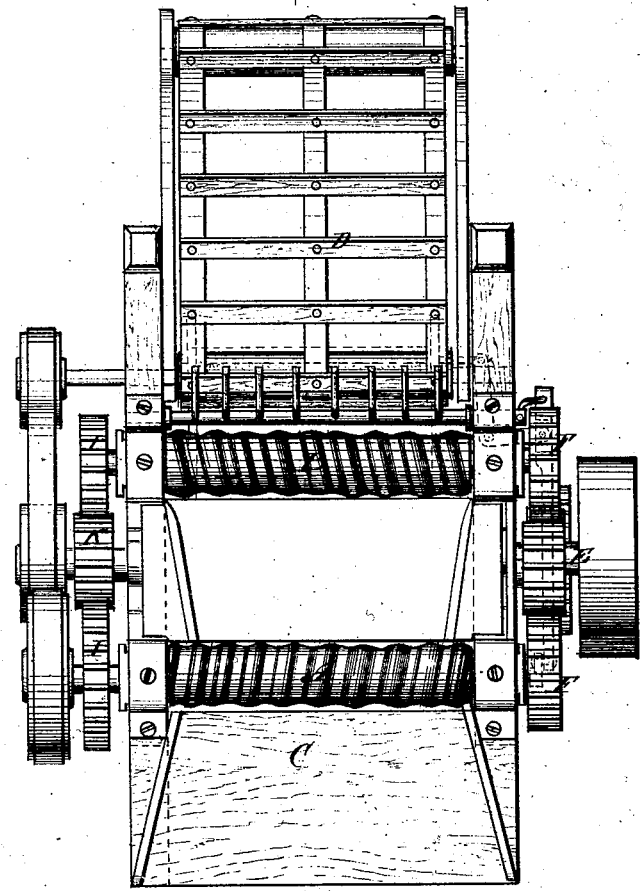

No. 115,020.  
J. BOYCE.  
FLAX THRESHING AND SEPARATING MACHINE.  
PATENTED MAY 23, 1871.
2 SHEETS—SHEET 1.
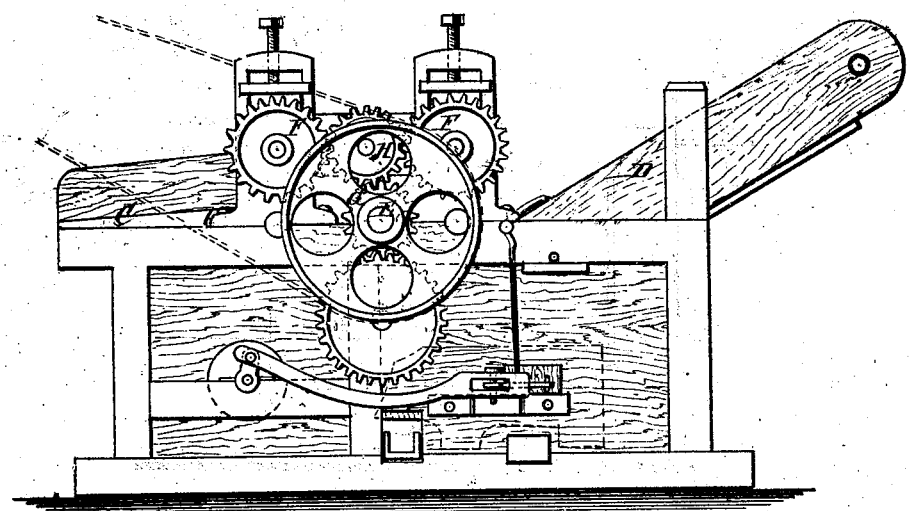
Fig. 2
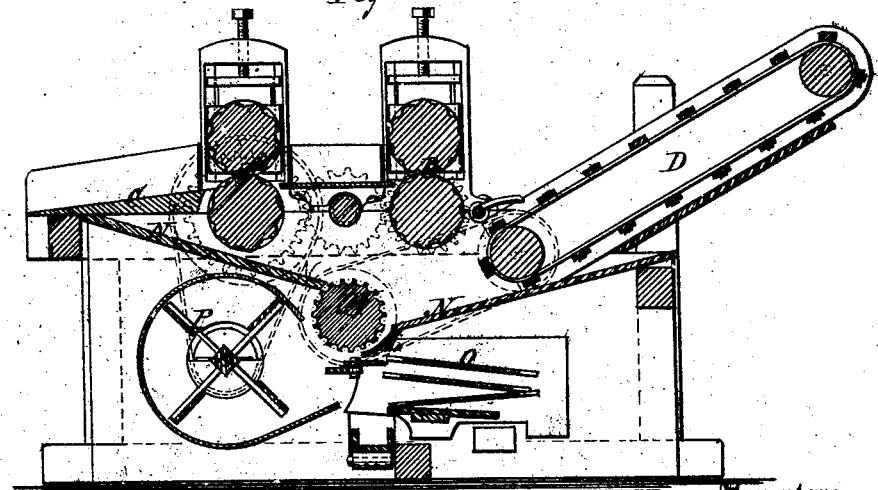
Witnesses:  
Inventor:  
J. Boyce  
PER Munn & Co.  
Attorneys.

No. 115,020.  PATENTED MAY 23, 1871.
J. BOYCE.
FLAX THRESHING AND SEPARATING MACHINE.

2 SHEETS—SHEET 2.

Witnesses:
Inventor:

UNITED STATES PATENT OFFICE.

JAMES BOYCE, OF MUNCIE, INDIANA.

IMPROVEMENT IN FLAX THRASHING AND SEPARATING MACHINES.

Specification forming part of Letters Patent No. 115,020, dated May 23, 1871.

*To all whom it may concern:*

Be it known that I, JAMES BOYCE, of Muncie, in the county of Delaware and State of Indiana, have invented a new and Improved Flax Thrashing and Separating Machine; and I do hereby declare that the following is a full, clear, and exact description thereof, which will enable others skilled in the art to make and use the same, reference being had to the accompanying drawing forming part of this specification.

My invention consists in certain improvements in flax thrashers and separators, which will be hereinafter fully described and subsequently pointed out in the claim; and it further consists in the combination with the above of a fluted or corrugated concave arranged underneath the rollers, in which works a grooved or fluted roller, and which receives all the unbroken bolls and tailings, rubs out the seed, and discharges on a properly-adjusted riddle, subject to the action of a fan which is placed under the front of the machine, in a manner to enable me to dispense with the elevators commonly used for conveying these tailings from the thrasher to the other apparatus, as in the common way. The arrangement of the fan and riddles with the thrashing apparatus is such as to economize room and expense in the construction of the machine.

Figure 1 is a side elevation of my improved machine; Fig. 2 is a longitudinal sectional elevation of the same; and Fig. 3 is a plan view.

Similar letters of reference indicate corresponding parts.

A and B represent two pairs of crushing, drawing, and thrashing rollers mounted on a suitable frame, between the feeding-table C and the elevator D, for receiving the flax or other substance to be acted on, and conveying it, while acting on it, to the said elevators. These rollers have spiral grooves around them, as shown in Fig. 1, and the rollers of a pair have the said grooves inclined in opposite directions; also, one roller is caused to turn faster than another, and each succeeding pair, of which there may be one or more, is caused to turn faster than the preceding one. To accomplish this the upper rollers are geared at one side of the frame to a common driving-shaft, E, by the wheels F and G and an idler, H, and the lower ones are geared at the other side to the said driving-shaft by the wheels I and pinion K.

The object of each roller in each pair having a different motion, and of the spiral flutes inclined in opposite directions, is to give a rubbing motion on the flax-bolls at the same time the straw is carried forward.

The object of each succeeding pair of rollers having a faster motion than the preceding pair is to draw, straighten, thin out, and thus change the position of the straw, so that all the bolls may be subject to the rubbing of the rollers. The reversed spiral flutes on the rollers rub together with a kind of shearing action, which is much more effective than any other arrangement.

Underneath the said rollers I have arranged, in an adjustable manner, a fluted or corrugated concave, L, in which works a grooved or fluted roller, M, which receives from the hopper of inclined boards N all unbroken bolls and tailings dropping down from the thrashing-rollers, and rubs out the seed and discharges on the shaking-riddle O, which is subject to the action of a fan-blower, P, which is placed under the front of the machine, which roller, concave fan, and riddles, are so arranged relatively to the thrashing-rollers and other parts of the machines as to economize greatly in room and the cost of construction. It also provides a machine which does not require as much attention as other machines.

Having thus described my invention, I claim as new and desire to secure by Letters Patent—

1. The combination of two or more sets of rolls, A B, constructed and operated as described, fluted roll M, concave L, and guide-boards N, all arranged as and for the purpose specified.

2. The combination and arrangement, in a flax-thrashing machine, of the breaking-rolls A B, elevator D, crushing-roll M, guide-boards N, concave L, riddle O, and fan P, substantially as and for the purpose specified.

JAS. BOYCE.

Witnesses:
C. SAMPLE,
A. F. PATTERSON.